E197A XR 3,633,123 p-96.14

United States Pate 3,633,123

[72] Inventor Enrique A. J. Marcatili
Rumson, N.J.
[21] Appl. No. 851,372
[22] Filed Aug. 19, 1969
[45] Patented Jan. 4, 1972
[73] Assignee Bell Telephone Laboratories Incorporated
Murray Hill, N.J.

[54] POWER COMBINING OF OSCILLATORS BY INJECTION LOCKING

6 Claims, 3 Drawing Figs.

[52] U.S. Cl. .......... 331/56, 331/94.5, 330/4.5, 333/6, 333/84, 333/90 S
[51] Int. Cl. .......... H03b 3/06, H01s 3/10, H01p 7/00
[50] Field of Search .......... 331/94.5, 45–56, 107; 330/4.5; 333/84, 955, 6

[56] References Cited

UNITED STATES PATENTS

| | | | |
|---|---|---|---|
| 3,555,447 | 1/1971 | Bonfeld et al. .......... | 331/107 X |
| 3,573,651 | 4/1971 | Engelbr et al. .......... | 331/107 X |

*Primary Examiner*—Ronald L. Wibert
*Assistant Examiner*—R. J. Webster
*Attorneys*—R. J. Guenther and Arthur J. Torsiglieri

ABSTRACT: Injection-locking is employed to produce phase coherency among a plurality of otherwise free-running incoherent oscillators. The outputs from the injection-locked oscillators are successively coupled together by means of a succession of quadrature couplers whose transmission and reflection coefficients are a function of the amplitudes of the signals incident thereon. The output signal power derived from the last of said couplers is the sum of the powers of the individual oscillators.

INVENTOR
E. A. J. MARCATILI
BY
Sylvan Sherman
ATTORNEY

POWER COMBINING OF OSCILLATORS BY INJECTION LOCKING

This invention relates to the use of injection-locking to induce phase coherency among a plurality of free-running oscillators, and for summing their output powers.

BACKGROUND OF THE INVENTION

At many frequencies, and in particular, at optical frequencies, it is not always feasible to construct a single oscillator whose output power is large enough for some particular application. It then becomes necessary to use two or more oscillators and add their outputs. In U.S. Pat. No. 3,414,840, issued to M. DiDomenico and H. Seidel, one such arrangement is disclosed using a multibranched cavity structure and a plurality of interconnected, substantially identical active lasing regions. Clearly, such an arrangement does not lend itself to the more general situation where the outputs from a plurality of separate, dissimilar oscillators are to be combined.

SUMMARY OF THE INVENTION

In accordance with the present invention, injection-locking is employed to produce phase coherency among a plurality of otherwise free-running incoherent oscillators. The outputs from the injection-locked oscillators are successively coupled together by means of a succession of quadrature couplers whose transmission and reflection coefficients are a function of the amplitudes of the signals incident thereon. The output signal power derived from the last of said couplers is the sum of the powers of the individual oscillators.

The various features of the invention and its advantages will appear more fully upon consideration of the various illustrative embodiments now to be described in detail in connection with the accompanying drawings.

DETAILED DESCRIPTION

Figure 1:
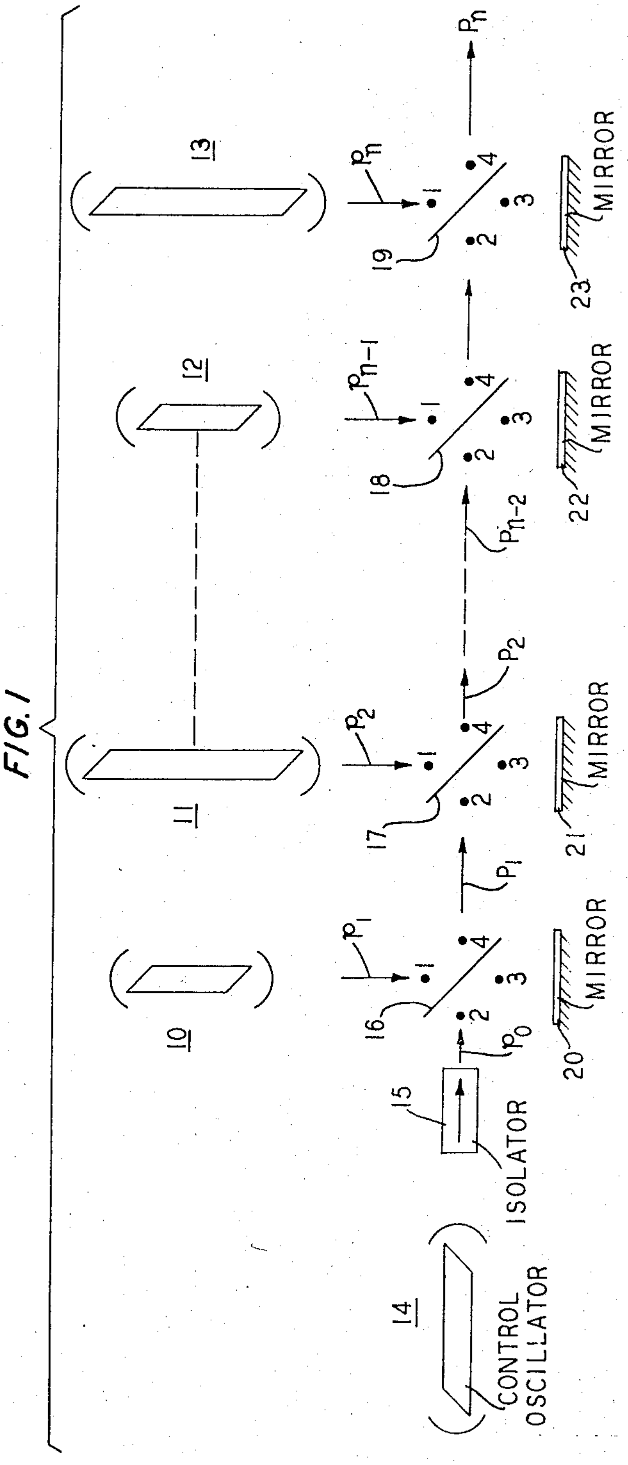
FIG. 1 shows a first embodiment of the invention.

Referring to the drawings, FIG. 1 shows a first embodiment of the invention comprising a plurality of *n* laser oscillators, (of which four 10, 11, 12 and 13 are shown) whose outputs are to be combined. The oscillators can be identical or, more generally, can all be different. The only requirement is that their free-running frequencies are close enough to permit injection-locking of all the oscillators at a common frequency.

The injection-locking signal is derived from a laser oscillator 14 whose frequency is the desired output frequency. This oscillator is advantageously a stabilized, single-mode laser whose output power is adequate to injection-lock the first oscillator 10 in the sequence. To prevent reflected power from reaching oscillator 14 and adversely interacting therewith, an isolator 15 is located between the output from oscillator 14 and the rest of the circuit.

The power output derived from each of the oscillators 10 through 13 is successively added to that of the preceding oscillators by means of a quadrature hybrid coupler. At optical frequencies, beam splitters 16, 17, 18 and 19, comprising particularly silvered mirrors, can be employed for this purpose. Identifying the two pairs of conjugate ports of each coupler as 1-2 and 3-4, the oscillators 10 through 13 are coupled to port 1 of the respective couplers; the combined outputs from the preceding lasers are coupled to the number 2 port; port 3 of each of the couplers 16 through 19 is coupled to a totally reflecting mirror 20, 21, 22 and 23, respectively; port 4 constitutes the output port for each of the stages.

In operation, a component of the output signal from synchronizing oscillator 14 is coupled into oscillator 10 by means of coupler 16 and mirror 20. This synchronizing component will "pull" oscillator 10 until the latter "locks" at the frequency of oscillator 14. In addition, oscillator 10 will lock at a phase relative to oscillator 14 so as to minimize the synchronizing component of signal coupled into oscillator 10. In particular, the amplitude of the synchronizing component reduces to zero, when the synchronizing signal coupled into port 2 of coupler 16 is 90°out of phase with the output signal from oscillator 10 coupled into port 1 of coupler 16, and the amplitude of the coefficient of transmission $t_{16}$ of coupler 16 is given by $$|t_{16}|=\sqrt{\frac{p_0}{p_0+p_1}} \qquad (1)$$

where $p_o$ is the input synchronized signal power; and $p_1$ is the signal power from oscillator 10.

As long as oscillator 10 remains injection-locked in this manner, all of the power $p_o$ from oscillator 14 and all of the power $p_1$ from oscillator 10 combine in output port 4 of coupler 16 to produce an output signal whose power content $P_1$ is $$P_1=p_o+p_1 \quad (2)$$

Any tendency for oscillator 10 to fall out of synchronism will disturb the phase relationship at the coupler resulting in a component of synchronizing signal again being injected into oscillator, thereby reestablishing a locked condition. Isolator 15 prevents output power from oscillators 10–13 from reaching oscillator 14. Thus, the synchronizing frequency is independent of the other oscillators, and is totally determined by the free-running frequency of oscillator 14.

The output, $P_1$, from coupler 16 is coupled to the next coupler 17 in the sequence, along with the output $p_2$ from oscillator 11. Synchronization occurs in the same manner, to produce an output signal $P_2$ given by $$P_2=P_1+p_2 (3)$$

In general, the output from the $i^{th}$ coupler in the sequence is given by $$P_i=\sum_{j=0}^{i} p_j \qquad (4)$$

and the coefficient of transmission $|t_i|$ for the $i^{th}$ coupler is given by $$|t_i|=\sqrt{\frac{\sum_{j=0}^{i-1} p_j}{\sum_{j=0}^{i} p_j}} \qquad (5)$$

Figure 2:
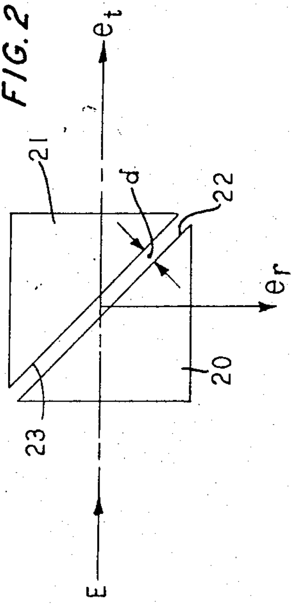
FIG. 2 shows an adjustable beam splitter for use in the embodiment of FIG. 1.

It will be noted that the coefficients of transmission defined by equation (5) will, in general, be different for each of the couplers 16 through 19. Advantageously, the requisite transmission characteristic is obtained by means of adjustable beam splitters of similar design. One such beam splitter, illustrated in FIG. 2, comprises two, substantially similar prisms 20 and 21, whose refractive index and that of their surroundings are such that input beam E is incident upon surface 22 of prism 20 at an angle greater than the critical angle. When the distance *d* between prisms is larger than a wavelength, most of the incident beam is internally reflected at surface 22 and $e_r \cong$ E. When surface 23 of prism 21 is brought closer than one wavelength to the corresponding surface 22 of prism 20, the electromagnetic fields set up in the region beyond surface 22 by the reflected wave are coupled into prism 21 and transmitted thereby. The amount of energy coupled between prisms depends upon the spacing *d*. When this spacing is reduced to less than about ⅛ of a wavelength, the coupling increases until $e_t \cong$E. Thus, each beam splitter can be individually adjusted to have the coefficient of transmission called for by equation (5). Advantageously, the prism edges are coated with an antireflecting material or are inclined at the Brewster angle to minimize reflection losses.

Figure 3:
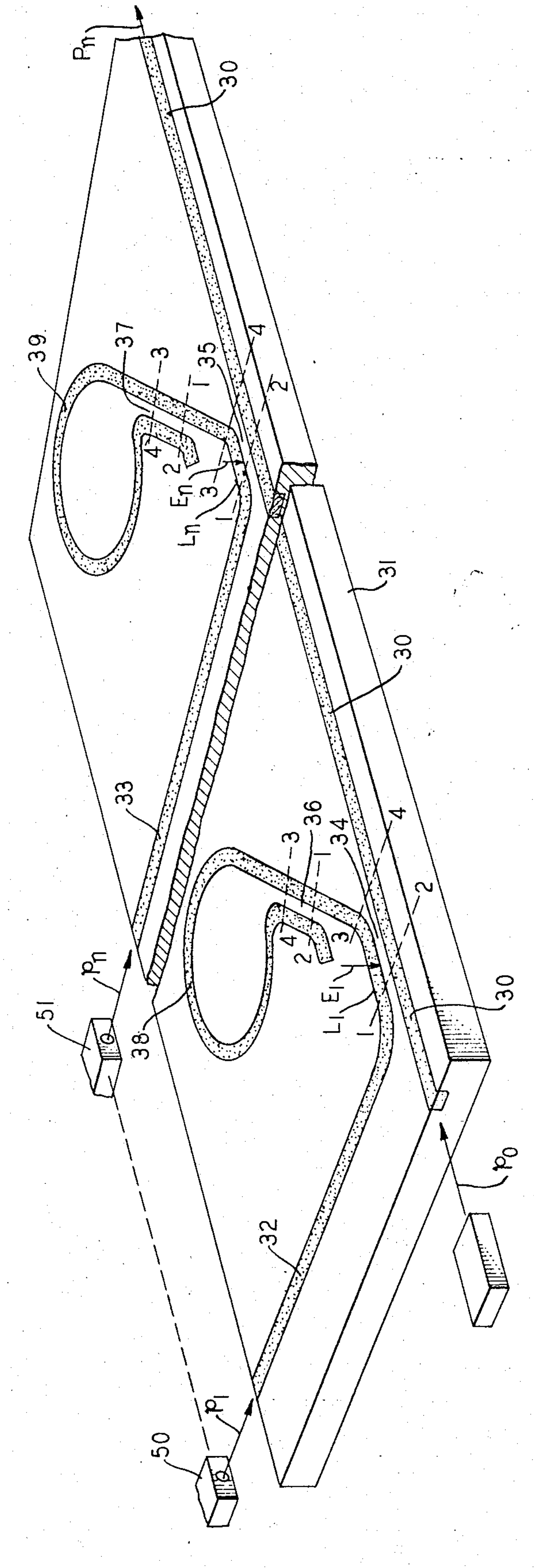
FIG. 3 shows a second embodiment of the invention using dielectric waveguide.

FIG. 3 is an alternate embodiment of the invention employing the waveguiding techniques and circuit components described in may copending applications Ser. No. 730,192, filed May 17, 1968 and Ser. No. 750,816, filed Aug. 17, 1968. As explained therein, the wavepath and each of the components is formed by one or more transparent dielectric strips embedded in a transparent dielectric substrate of slightly lower refractive index. Thus, in the embodiment of FIG. 3., the main wavepath along which all the signal energy is accumulated comprises a thin dielectric strip 30, embedded in a substrate 31 of slightly lower refractive index. A synchronizing signal $p_o$ is coupled into one end of strip 30, and the accumulated output signal $p_n$ is extracted at the other end of strip 30.

In the remaining description to follow, the circuit components and transmission lines referred to shall be understood to comprise a transparent guiding strip partially or totally embedded in a suitable substrate. However, in order to simplify the description, reference will be made only to the guiding strip portion of the wavepath, it being understood that in each instance the strip is embedded in a substrate.

Thus, referring again to FIG. 1, the signal sources 50...51 to be synchronized are coupled, respectively, to transmission lines 32...33. The latter, which are normally widely spaced apart from strip 30, extend relatively close to the latter over coupling intervals $L_1...L_n$ to form directional couplers 34...35. Using the same notation as in FIG. 1, each of the signal sources is coupled to port 1 of the directional couplers; the synchronizing signal is coupled to port 2; port 4 is the output port; and port 3 is reactively terminated. In FIG. 3, the reactive terminations comprise 3 db. directional couplers 36...37, and sections of transmission line 38...39 for coupling branches 3 and 4 of couplers 36...37 together. (For a more detailed description of this type of reactive termination see my above-identified copending application Ser. No. 750,816.)

The operation of this embodiment of the invention is the same as was described in connection with FIG. 1. In terms of the coefficient of coupling $k_i$ of the $i^{the}$ coupler, all of the signal energy is coupled into the main wavepath 30 when $$|k_i| = \sqrt{\frac{p_i}{\sum_{j=0}^{i} p_j}} \qquad (6)$$

Since the coefficient of coupling is a function of the refractive index of the guiding strip and the substrate, the coupling is conveniently and effectively controlled by changing the refractive index of either or both of them along the coupling interval. Accordingly, substrate 30 is advantageously made of an electro-optic material, and an adjustable electric field $E_1...E_n$ is impressed across each of the couplers to produce the coefficients called for by equation (6).

While the invention has been described with particular reference to optical wave energy, it is understood that the same techniques can be used to synchronize a plurality of signal sources at lower frequencies as well. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. An arrangement for injection-locking a plurality of oscillators whose free-running frequencies are approximately equal, and for summing their output powers, comprising:

a control oscillator having a frequency substantially equal to the frequencies of said plurality of oscillators;

a plurality of quadrature couplers having two pairs of conjugate ports;

and an isolator interposed between said control oscillator and said plurality of gradrature couplers;

Characterized in that:

each of said oscillators is coupled to one port of one of the pairs of conjugate ports of a different one of said plurality of couplers;

one port of the second pair of conjugate ports of each of said couplers is short-circuited, where the coefficient of transmission between said one ports is given as $t_i$;

said control oscillator is coupled through said isolator in the low-loss direction to the other port of said first pair of ports of the first coupler in said sequence of couplers;

the other port of said second pairs of ports of each of said couplers is coupled to the other port of said first pair of ports of the next successive coupler in said sequence;

an output signal is derived from the second port of the second pair of ports of the last of said couplers;

and in that the amplitude of the coefficient of transmission $t_i$ for the $i^{th}$ coupler in said sequence of couplers is given by $$|t_i| = \sqrt{\frac{\sum_{j=0}^{i-1} p_j}{\sum_{j=0}^{i} p_j}}$$

where $p_o$ is the power derived from the control oscillator; and $p_j$ is the power derived from the $j^{th}$ oscillator.

2. The arrangement according to claim 1 wherein said oscillators are lasers; and wherein said couplers are beam splitters.

3. The arrangement according to claim 2 wherein said beam splitters are partially silvered mirrors.

4. The arrangement according to claim 2 wherein said beam splitters comprise two prisms.

5. The arrangement according to claim 1 wherein said oscillators are lasers;

and wherein said lasers are coupled by means of dielectric waveguides comprising a low-loss dielectric substrate and a pair of elongated, low-loss dielectric strips of higher refractive index than said substrate embedded therein;

said strips being in coupling relationship along a portion of their lengths.

6. The arrangement according to claim 5 wherein said quadrature couplers comprise a low-loss dielectric substrate and a pair of elongated, low-loss dielectric strips of higher refractive index than said substrate embedded therein;

* * * * *